Nov. 30, 1926.
G. LOECK
1,608,604
DEVICE FOR PHOTOGRAPHING THE INTERIOR OF TUBES AND CAVITIES IN THE BODY
Filed July 8, 1925
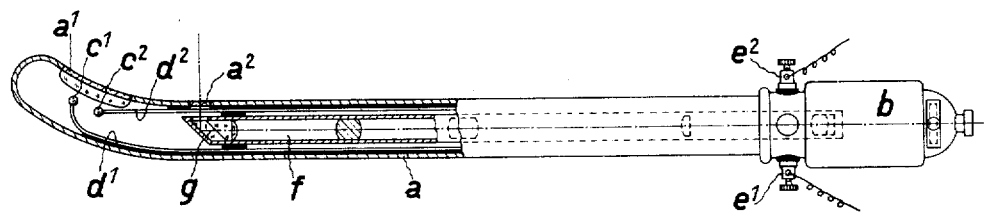
Inventor:
Günther Loeck Patented Nov. 30, 1926.

1,608,604

UNITED STATES PATENT OFFICE.

GÜNTHER LOECK, OF BERLIN, GERMANY, ASSIGNOR TO GEORG WOLF G. M. B. H., OF BERLIN, GERMANY.

DEVICE FOR PHOTOGRAPHING THE INTERIOR OF TUBES AND CAVITIES IN THE BODY.

Application filed July 8, 1925, Serial No. 42,327, and in Germany July 22, 1924.

The present invention relates to devices for photographing the interior of tubes and cavities in the body, and which are provided with a source of light to be introduced into the interior of the body for instance such devices as cystoscopes and gastroscopes having a photographic outfit. According to the invention this device is fitted with a spark cap instead of the electric glow lamp hitherto used. For the illumination during the exposure an electric spark produced between the electrodes of the spark gap is used. It has been proved that such a spark, although being only of short duration, may yet be very effective for photographic work, so that good snapshots can be attained in this manner.

The annexed drawing shows, partly in a section and partly in a front view, a cystoscope provided with a photographic outfit according to the present invention.

The instrument has an outer tube $a$ upon one end of which is placed a photographic camera $b$ and the other end of which is provided with two windows $a^1$ and $a^2$. Behind the window $a^1$ is disposed a spark gap, formed by two balls $c^1$ and $c^2$. Of these two balls the one, marked $c^1$, is connected to a terminal $e^1$ by means of a line $d^1$ and the one, marked $c^2$, to a terminal $e^2$ by means of a line $d^2$. Both lines are fixed on the outer tube $a$ and insulated from it. Into the outer tube is introduced a second tube $f$, carrying the imaging system, in such a way that the ray-entrance prism denoted by $g$ lies behind the window $a^2$.

I claim:

Device for photographing the interior of tubes and cavities in the body, containing a tube adapted to be introduced into the space to be photographed, the tube containing a spark gap and lines connected to this spark gap, the said lines being provided with terminals for connecting a source of current, a light gap being disposed on the tube in order to allow the light, produced by the spark gap, to emerge into the space to be photographed, and an optical system disposed in the tube and adapted to transmit the luminous rays reflected by the spot to be photographed to the extremity of the said tube.

GÜNTHER LOECK.